(12) United States Patent
Bobier

(10) Patent No.: US 7,003,047 B2
(45) Date of Patent: Feb. 21, 2006

(54) TRI-STATE INTEGER CYCLE MODULATION

(75) Inventor: Joseph Bobier, Sunrise, FL (US)

(73) Assignee: XG Technology, LLC, Sarasota, FL (US)

( * ) Notice: Subject to any disclaimer, the term of this patent is extended or adjusted under 35 U.S.C. 154(b) by 0 days.

(21) Appl. No.: 10/875,419

(22) Filed: Jun. 24, 2004

(65) Prior Publication Data

US 2005/0008087 A1    Jan. 13, 2005

Related U.S. Application Data

(60) Provisional application No. 60/482,173, filed on Jun. 24, 2003.

(51) Int. Cl.
*H04L 27/10* (2006.01)
*H04L 27/12* (2006.01)
*H04L 27/14* (2006.01)

(52) U.S. Cl. ............... 375/275; 375/295; 375/335

(58) Field of Classification Search .......... 375/295, 375/272, 275, 276, 334–337, 316; 329/300, 329/315, 318, 320, 321; 332/100, 117, 123–125; 455/42, 39, 91, 130

See application file for complete search history.

(56) References Cited

U.S. PATENT DOCUMENTS

| | | | | | |
|---|---|---|---|---|---|
| 3,766,477 A | * | 10/1973 | Cook | ........................ | 375/130 |
| 3,845,391 A | * | 10/1974 | Crosby | ........................ | 455/39 |
| 4,425,666 A | * | 1/1984 | Groth, Jr. | ................... | 375/275 |
| 5,642,380 A | * | 6/1997 | Lambert | ...................... | 375/223 |
| 5,684,837 A | * | 11/1997 | Chen | ............................ | 375/334 |
| 5,789,991 A | * | 8/1998 | Ishii | .............................. | 332/100 |

* cited by examiner

*Primary Examiner*—Tesfaldet Bocure
(74) *Attorney, Agent, or Firm*—Dennis L. Cook, Esq.

(57) ABSTRACT

The invention disclosed in this application uses a method of modulation named Tri-State Integer Cycle Modulation (TICM) wherein a carrier signal, comprised of a continuum of sine waves is modulated such that spectrum utilization is minimal. A modulation event is imposed upon the carrier signal by modifying the carrier frequency at precisely the zero crossing point or the zero degree angle. The method of imposing the modulation event is by increasing the frequency of the carrier for one or an integer number of wavelets then lowering the frequency of the carrier for one or the same integer number of wavelets then returning to the carrier frequency to derive the modulation event. The main carrier frequency is only modulated beginning at the zero degree phase angle and ending at the 360-degree phase angle.

17 Claims, 3 Drawing Sheets

TRI-STATE INTEGER CYCLE MODULATION

CROSS-REFERENCE TO RELATED APPLICATION

The present application claims the benefit of previously filed co-pending Provisional Patent Application, Ser. No. 60/482,173, Jun. 24, 2003.

FIELD OF THE INVENTION

This invention addresses the need to transport high bit-rate data over wired or wireless means using specially modulated radio frequency carrier waves. Specifically, the invention provides a FM modulated signal and method of modulation by which the spectral channel width occupied by the radio signal can remain very narrow even though the data bit-rate, which is used as the modulating signal, may be very fast.

BACKGROUND OF THE INVENTION

Radio transmission of information traditionally involves employing electromagnetic waves or radio waves as a carrier. Where the carrier is transmitted as a sequence of fully duplicated wave cycles or wavelets, no information is considered to be transmissible. To convey information, historically, the carrier has superimposed on it a sequence of changes that can be detected at a receiving point or station. The changes imposed correspond with the information to be transmitted, and are known in the art as "modulation".

Where the amplitude of the carrier is changed in accordance with information to be conveyed, the carrier is said to be amplitude modulated (AM). Similarly, where the frequency of the carrier is changed in accordance with information to be conveyed, either rarified or compressed wave cycles are developed, and the carrier is said to be frequency modulated (FM), or in some applications, it is considered to be phase modulated. Where the carrier is altered by interruption corresponding with information, it is said to be pulse modulated.

Currently, essentially all forms of the radio transmission of information are carried out with amplitude modulation, frequency modulation, pulse modulation or combinations of one or more. All such forms of modulation have inherent inefficiencies. For instance, a one KHz audio AM modulation of a Radio Frequency (RF) carrier operating at one MHz will have a carrier utilization ratio of only 1:1000. A similar carrier utilization occurs with corresponding FM modulation. Also, for all forms of currently employed carrier modulation, frequencies higher and lower than the frequency of the RF carrier are produced. Since they are distributed over a finite portion of the spectrum on each side of the carrier frequency, they are called side frequencies and are referred to collectively as sidebands. These sidebands contain all the message information and it has been considered that without them, no message can be transmitted. Sidebands, in effect, represent a distribution of power or energy from the carrier and their necessary development has lead to the allocation of frequencies in terms of bandwidths by governmental entities in allocating user permits within the radio spectrum. This necessarily limits the number of potential users for a given RF range of the spectrum.

To solve the bandwidth crisis in the RF Spectrum, multiple access systems were developed. Multiple Access Systems are useful when more than one user tries to transmit information over the same medium. The use of multiple access systems is more pronounced in Cellular telephony; however, they are also used in data transmission and TV transmission. There are three common multiple access systems. They are:
1. Frequency Division Multiple Access (FDMA)
2. Time Division Multiple Access (TDMA)
3. Code Division Multiple Access (CDMA)

FDMA is used for standard analog cellular systems. Each user is assigned a discrete slice of the RF spectrum. FDMA permits only one user per channel since it allows the user to use the channel 100% of the time. FDMA is used in the current Analog Mobile Phone System (AMPS).

In a TDMA system the users are still assigned a discrete slice of RF spectrum, but multiple users now share that RF carrier on a time slot basis. A user is assigned a particular time slot in a carrier and can only send or receive information at those times. This is true whether or not the other time slots are being used. Information flow is not continuous for any user, but rather is sent and received in "bursts". The bursts are re-assembled to provide continuous information. Because the process is fast, TDMA is used in IS-54 Digital Cellular Standard and in Global Satellite Mobile Communication (GSM) in Europe. In large systems, the assignments to the time/frequency slots cannot be unique. Slots must be reused to cover large service areas.

CDMA is the basis of the IS-95 digital cellular standard. CDMA does not break up the signal into time or frequency slots. Each user in CDMA is assigned a Pseudo-Noise (PN) code to modulate transmitted data. The PN code is a long random string of ones and zeros. Because the codes are nearly random there is very little correlation between different codes. The distinct codes can be transmitted over the same time and same frequencies, and signals can be decoded at the receiver by correlating the received signal with each PN code.

The great attraction of CDMA technology from the beginning has been the promise of extraordinary capacity increases over narrowband multiple access wireless technology. The problem with CDMA is that the power that the mobiles are required to transmit goes to infinity as the capacity peak is reached. i.e. the mobiles will be asked to transmit more than their capacity allows. The practical consequence of this is that the system load should really be controlled so that the planned service area never experiences coverage failure because of this phenomenon. Thus CDMA is a tradeoff between maximum capacity and maximum coverage.

Over the previous few decades, electronically derived information has taken the form of binary formatted data streams. These data streams are, for the most part, transmitted through telecommunication systems, i.e., wire. Binary industry communication in general commenced with the networking of computer facilities in the mid 1960s. An early networking architecture was referred to as "Arpanet". A short time later, Telenet, the first public packet-switched network, was introduced to commerce. As these networks grew, protocols for their use developed. For example, a coding protocol, ASCII (American Standard Code for Information Interchange) was introduced in 1964. Next, Local Area Networks (LAN) proliferated during the 1970s, the oldest and most prominent, Ethernet, having been developed by Metcalfe in 1973. Under the Ethernet concept, each station of a local system connects by cable to a transceiver and these transceivers are then inter-linked. In 1983, the Institute of Electrical and Electronic Engineers (IEEE) promulgated Ethernet with some modifications, as the first standard protocol for Local Area Networks. The Ethernet protocol remains a standard for essentially all forms of database conveyance or exchange.

It is well known by those skilled in the art that a radio signal consists of at least one electromagnetic energy packet. These packets are comprised of both an electrical field and a magnetic field traveling through space. The mathematical description of each field is that of a sinusoidal shape, with each field conjoined in a transverse relationship, mutually dependant upon one another.

In the traditional usage, when these packets (photons) are generated together into a continuum of sequential sine waves, we have what is referred to as a radio carrier, which, if constituted of identical packets, is said to be un-modulated. For the radio spectrum to be pure, which consists of only one single and narrow radio channel when plotted on a spectral diagram, the packets are conjoined temporally so that as the phase angle of a preceding packet crosses the zero-degree end point, the proceeding packet is just beginning at the zero-degree angle. Thus from the perspective of the observer, a continuous 360 degree undulation of both electrical and magnetic fields would be observed.

Any radio system in use today will modify large groups of these conjoined packets in one or more ways to convey information. For example, a modern wireless phone might transmit near a frequency of 1.9 GHz and modulate the carrier at a rate of about 6 KHz to achieve a data throughput of 14.4 kbps. In this example, a portion of the carrier, consisting of about 316,366 individual sine waves is modified as a group to represent a single binary bit.

To represent the simplest form of communication, the binary system, there are several ways to alter at least one of the following four characteristics of the continuum of sine wave packets (referred to herein as sine waves) to indicate to the receiving mechanism that a binary one or zero is conveyed.

Sine waves can be modified in at least the following four basic ways:

1. Amplitude: The amplitude of the electrical and magnetic fields can be increased or decreased to cause either a larger or smaller signal to be detected at the receiving device. The change in amplitude can represent the conveyance of a binary one or a binary zero or even a change in binary state when the previous state is already known.
2. Frequency: The period of the individual sine waves within a group can be increased or decreased to make the same representation as in example one above. This is also called frequency modulation.
3. Interruption: The continuum of sine waves can be interrupted, then re-established to indicate a zero or one condition, or as in example one and two above, the interruption could represent a change in logic state assuming the previous state was known. This is sometimes known as CW or Pulse code modulation.
4. Phase: The phase of a group of sine waves could be altered so that the sine waves are in fact not sine waves any more. They now consist of an amalgamation of two or more frequencies, whose presence indicates the conditional change in logic state.

Many modulation techniques now exist that use any of the above methods either singularly or in combination. Lately a mixing of these methods has been in popular use because by modifying more than one characteristic, more than one single logic state can be represented. For instance the Quadrature Amplitude Modulation system (QAM) can combine the use of both amplitude and frequency modulation to represent multiple binary combinations.

Even though binary data stream transmission by wire has improved substantially in terms of data transfer rates, that improvement has not been the case where transmission is by utilization of the RF spectrum. Current technology in data stream transmission by wire is shown in U.S. Pat. No. 5,661,373 titled Binary digital signal transmission system using binary digital signal of electrically discharged pulse and method for transmitting binary digital signal and issued Aug. 26, 1997 to Nishizawa, which discloses a binary digital signal transmission system wherein a transmitter generates a binary digital signal including at least a rise portion where a level of the binary digital signal steeply rises in accordance with inputted binary digital data of a first value, and at least a fall portion where the level of the binary digital signal steeply falls in accordance with the inputted binary digital data of a second value, and then transmits the binary digital signal via a cable to a receiver. On the other hand, the receiver receives the transmitted binary digital signal, and first and second resonance circuits respectively have two resonance frequencies which are even multiples of each other, and extract first and second resonance signals respectively having resonance frequency components of the two resonance frequencies, from the received binary digital signal. Thereafter, a data discriminator discriminates a value of the binary digital data corresponding to the received binary digital signal based on a phase relationship between the extracted first and second resonance signals, and outputs either one of a pulse signal representing the first value and another pulse signal representing the second value.

As discussed above it is well recognized by those skilled in the art that in modern radio communications a troubling problem exists in the utilization of spectrum. Many radio communication services exist to support the market needs of many diverse users. Government agencies regulate the usage of radio spectrum among such diverse users as government, military, private business, radio common carriers (RCC) and unlicensed individual users. The need for radio spectrum is an immense problem. The problem is compounded because modern radio systems transport binary digital information using modulation methods that are merely adaptations of methods that were originally designed for conveyance of analog information. Namely, voice, music and video transmissions, which were the sole forms of information in the 20th century, are now quickly being replaced with digital representations of the same. Added to this is the need to allow the user to access digital information from the Internet, corporate databases and other sources. Truly this is a modern problem. Since the means of modulating the radio carrier are still the same as those used in the past the amount of spectral width required by individual transmitters is ever increasing. Well-known theories of modulation define these modulation systems and dictate that as the amount of information increases in a given modulated stream, the number of spectral byproducts, called sidebands will increase. For instance, using common methods of radio modulation, a typical channel width for a digital transmission will be about ½ of the rate of binary state change. Applied in real terms, a radio transmitter that is conveying information at a rate of 100 kilobits per second (KBPS) will require a clear section of radio spectrum of about 50 KHz of width, with the carrier at the center of the channel. In this age, 100 KBPS is a low rate of data transmission, so in practice many services are requiring huge allocations of the limited spectrum resource.

A solution is required that will allow the maximum amount of information to be conveyed, while consuming the least amount of spectral width.

Tri-State Integer Cycle Modulation (TICM) is designed to help alleviate this massive and growing problem. Its signal characteristics are such that absolute minimal sideband energy is generated during modulation, allowing concurrent use of spectrum by many users. Sideband spacing is discrete. For example sidebands are always located at specific upper and lower positions, not occupying wide areas of contiguous spectrum between the carrier and each singular sideband. This allows very dense overlapping multiplex of TICM signals in close proximity, thus resulting in a dramatic increase in the utilization of spectrum.

BRIEF SUMMARY OF THE INVENTION

The invention disclosed in this application uses a method of modulation named Tri-State Integer Cycle Modulation (TICM). A description of the technique follows:

The carrier wave consists of a continuum of sine wave RF cycles at a given fixed frequency. This frequency range can vary from low-frequency radio signals to high-frequency microwave.

All RF cycles are perfect sine waves.

Data is imposed upon the carrier wave by altering the base radio frequency of two sine waves of the continuum. A modulation event therefore consists of the frequency modification of two RF sine wave cycles (wavelets). Note that three (3), and only three (3) frequencies are needed for the xG™ modulation scheme. These three (3) frequencies can be extremely close (e.g. less than 30 Khz apart, which is a standard cellular channel) or significantly further apart, depending upon the ability of the receiver to differentiate the frequencies. The modulation can thus be thought of as performed on an integer cycle basis. The sequence of events in the formation of one modulation event are as follows;

Insert one sinewave cycle into the carrier cycle continuum that is higher in frequency than the carrier.

Follow the above cycle with another cycle that is lower in frequency than the carrier. Return to the carrier frequency for the next and all proceeding cycles.

Between the base frequency sine waves and the modulated (alternate) frequency sine waves, there is perfect phase continuity. That is to say, the altered frequency sine waves will begin exactly at the 360 degree zero crossing point of the preceding cycle, and will continue through 360 degrees to an end exactly at the zero degree, zero crossing point of the proceeding sine wave.

The difference in radio frequency between, base carrier cycles and modulation event cycles is arbitrary, only constrained by the ability of the de-modulator to reliably differentiate the two signals.

The receiver (de-modulator) need only compare the frequency (phase time) of the current sine wave to the previous sine wave to determine whether or not a modulation event has occurred.

The invention accordingly, comprises the RF signal and the methods possessing the steps of modulation, transmission, and reception, which are exemplified in the following detailed description.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the following detailed description, taken in connection with the accompanying drawings, in which.

DETAILED DESCRIPTION OF THE INVENTION

Figure 1:
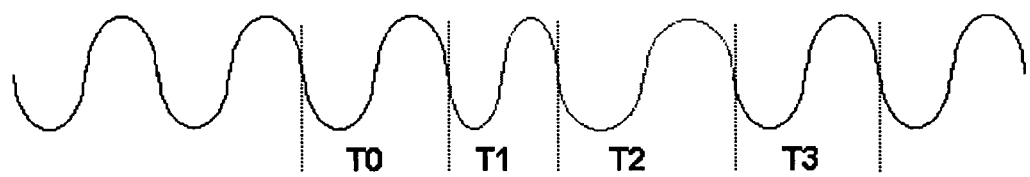
FIG. 1 is a representation of a TICM waveform.

In U.S. patent application Ser. No. 09/511,470 filed by Joseph Bobier (the inventor of this patent application), the contents of which are incorporated herein, a new method of carrier modulation referred to as "missing cycle modulation" (MCM) was disclosed. That method of modulation uses an RF carrier comprised of a continuum of full cycle sinusoidal wavelets extending between zero crossover points or positions, and that carrier is then modulated to carry binary information by selectively deleting one or a succession of carrier wavelets. Such a deletion may be assigned to represent either a binary one or zero value. The deletional modulation is carried out by the removal, by switching, of data related wavelets at the sinusoidal zero crossing positions defining them.

Inasmuch as these zero positions correspond with the absence of electro-magnetic wave energy, no wave disturbances are invoked which, would in turn, produce side frequencies. As a consequence, the assigned carrier frequencies may be quite close together in value to provide a substantially improved utilization of the radio spectrum for binary data transmittal.

In a related U.S. patent application Ser. No. 09/916,054 also filed by Joseph Bobier (the inventor of this patent application), the contents of which are incorporated herein, the deletional modulation of the original invention was modified to merely suppress the amplitude of the cycle resulting in suppressed cycle modulation (SCM). This type of modulation is accomplished when the carrier is amplitude modulated with a modulation signal that is equal in frequency to the carrier itself and the modulation always begins or ends upon the exact zero voltage crossing point of the RF cycle phase. The modulation is applied as a shift of the amplitude of any single cycle or succession of cycles, each such cycle or succession of cycles representing a single bit of data. In SCM, each individual RF cycle, or succession of cycles, represents one bit of data. A single cycle of RF, or succession of RF cycles, will either represent a "1" or "0" depending upon the amplitude of the cycle(s), relative to other adjacent cycles in the same carrier. It is necessary to visualize the carrier as a bit stream, rather than a carrier. The relative amplitude of one bit to another will determine the logical state. For instance, a cycle which is relatively higher in amplitude than other cycles in the stream might be considered to represent a "1". Conversely, a cycle that is relatively lower in amplitude than other cycles in the bit stream might be considered to represent a "0".

In U.S. patent application Ser. No. 10/765,442 entitled Integer Cycle Frequency Hopping Modulation for the Radio Frequency Transmission of High Speed Data (ICFM) there was disclosed a unique method of radio frequency modulation, also invented by the inventor of this disclosure, the contents of which are incorporated in full in this application. The purpose of all these method is to cause a radio frequency carrier to convey information in a manner that will utilize the minimum radio spectrum bandwidth while simultaneously conveying information at the highest possible rate.

As described previously, TICM is based upon the premise that individual photons, when used in the portion of the electromagnet spectrum referred to as radio, can be emitted and detected individually, and that these individual emanations can be used to represent individual messages in the form of binary numbers.

It was in the Nobel Prize winning disclosure by Albert Einstein that it was taught that photons of light, now understood to encompass all electromagnetic radiation, are self-contained packets of energy. Each photon can act as both a particle or a wave, depending upon the relative position of the observer. Each photon is a self-contained unit, requiring no other photons to exist. In this disclosure the terms "sinewave" and "packet" are used interchangeably. Thus we can extrapolate that just as photons of light can be emitted and detected individually and in isolation, photons of longer period, what we refer to as radio waves, can be likewise utilized. The modulation techniques described in this and previous applications uses this concept to reduce the number of photons used in radio communication to as few as an individual photon. These modulation techniques rely upon the single sine wave (or packet) to represent the most basic of information, the binary digit. In the simplest form, a transmitter will emit one single sine wave to represent one single binary event. In the embodiment previously disclosed, single emissions of sine waves of a given radio frequency represent one binary state, while single emissions of sine waves of another radio frequency are emitted to represent the alternative binary state. Therefore it can be said that the purest and simplest natural form of electromagnetic radiation, the single sine wave of radio energy, represents the simplest form of information conveyance, the binary digit or modulation event.

TICM embodies the following minimum set of characteristics to convey information while emitting the least amount of sideband energy.

The carrier wave consists of a continuum of sine wave RF cycles (wavelets) at a given fixed frequency. This frequency range can vary from low-frequency radio signals to high-frequency microwave.

All RF cycles are perfect sine waves.

Data is imposed upon the carrier wave by altering the base radio frequency of two of the sine wave cycles of the continuum. A modulation event therefore consists of the frequency modification of at least two, or other integer number, of RF sine wave cycles as shown in FIG. 1. Note that three (3), and only three (3) frequencies are needed for the TICM modulation scheme. These three (3) frequencies can be extremely close (e.g. less than 30 Khz apart, which is a standard cellular channel) or significantly further apart, depending upon the ability of the receiver to differentiate the frequencies. The modulation can thus be thought of as performed on an integer cycle basis. The sequence of events in the formation of one modulation event are as follows:

Insert at least one, or other integer number, of sine wave cycles into the carrier cycle continuum that is higher in frequency than the carrier.

Follow the above cycle with at least another, or the same integer number, of cycles that is lower in frequency than the carrier. Return to the carrier frequency for the next and all proceeding cycles. One embodiment of the resultant TICM waveform is shown in FIG. 1 wherein T1 is the carrier frequency, T2 is a cycle of higher frequency, and T3 is a cycle of lower frequency. Of course those skilled in the art will recognize that the lower and higher frequency sequence could be reversed with the same spectrum saving results.

Between the base frequency sine waves and the modulated (alternate) frequency sine waves, there is perfect phase continuity. That is to say, the altered frequency sine waves will begin exactly at the 360 degree zero crossing point of the preceding cycle, and will continue through 360 degrees to an end exactly at the zero degree, zero crossing point of the proceeding sine wave.

The difference in radio frequency between, base carrier cycles and modulation event cycles is arbitrary, only constrained by the ability of the de-modulator to reliably differentiate the two signals.

The receiver (de-modulator) need only compare the frequency (phase time) of the current sine wave to the previous sine wave to determine whether or not a modulation event has occurred.

Thus a radio transmission from a TICM transmitter will contain very little sideband energy, because there is little disturbance to the continuum of sine waves as seen by an observer.

In practical uses, the signal consists of at least three radio frequencies, separated by some spectral distance. Thus, we have a continuum of sine waves, some having a period equating to frequency "A" (upper frequency) and some having a period equating to frequency "B" (lower frequency) along with the carrier frequency. Between the carrier frequency sine waves and the upper and lower frequency sine waves, there is perfect phase continuity. That is to say, the altered frequency sine waves will begin exactly at the 360 degree zero crossing point of the preceding cycle, and will continue through 360 degrees to an end exactly at the zero degree, zero crossing point of the proceeding sine wave. Sideband spacing is discrete. For example sidebands are always located at specific upper and lower positions, not occupying wide areas of contiguous spectrum between the carrier and each singular sideband. This allows very dense overlapping multiplex of TICM signals in close proximity, thus resulting in a dramatic increase in the utilization of spectrum.

Figure 2:
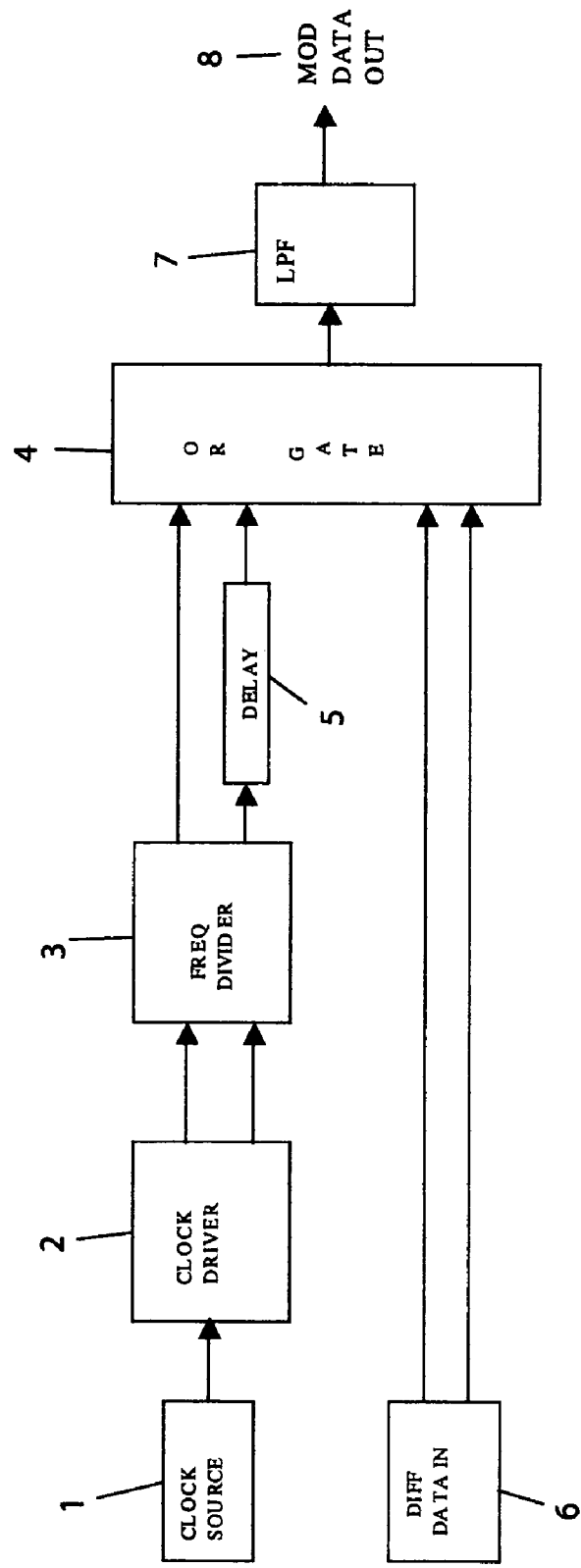
FIG. 2 is a block schematic diagram of a TICM transmitter.

Referring now to FIG. 2 the reader can see how the modulation system is implemented in an embodiment of a transmitter. The Clock Source (1) in the preferred embodiment is generated from an oscillator. This Clock Source (1) is twice the operating frequency. To convert this single ended Clock Source (1) into a differential clock, a Clock Driver (2) is used such as an onsemi MC100EP11 or other such devices well known to those skilled in the art. The Clock Driver (2), which is also a fanout buffer, provides a differential clock to the Frequency Divider (3) circuit. In the preferred embodiment a D type flip-flop such as a Onsemi MC100EP51 is used as a Frequency Divider (3) to divide the incoming clock frequency by 2. Next the differential divided by two clock goes into an OR Gate (4) (such as a Onsemi MC100EP101 well known to those skilled in the art) through two different paths. One path, the Delay (5), delays this clock by a fixed amount. This delay corresponds to the time difference between the frequencies used in the modulation system. In the preferred embodiment a Strip Line technique is used as the Delay (5) for the delayed clock. As a result of this delay, the circuit now contains two identical clocks slightly delayed from each other. These two clocks are fed to the OR Gate (4) along with the Differential Data (6) input. The Non-Delayed Clock is ORed with Data+ and the Delayed Clock is ORed with Data−. Both the outputs are once again ORed. All this is performed in the OR Gate (4). The output of the OR Gate (4) is a digital TICM signal. This digital signal is converted into a sinusoidal TICM signal by passing it through a Low Pass Filter(LPF) (7). Discrete passive components such as inductors, capacitors and resistors that are well known in the art are used to make a three pole Butterworth Low Pass Filter in the preferred embodiment. The output of LPF (7) is a TICM signal, or modulation event, as described above and shown in FIG. 1.

Figure 3:
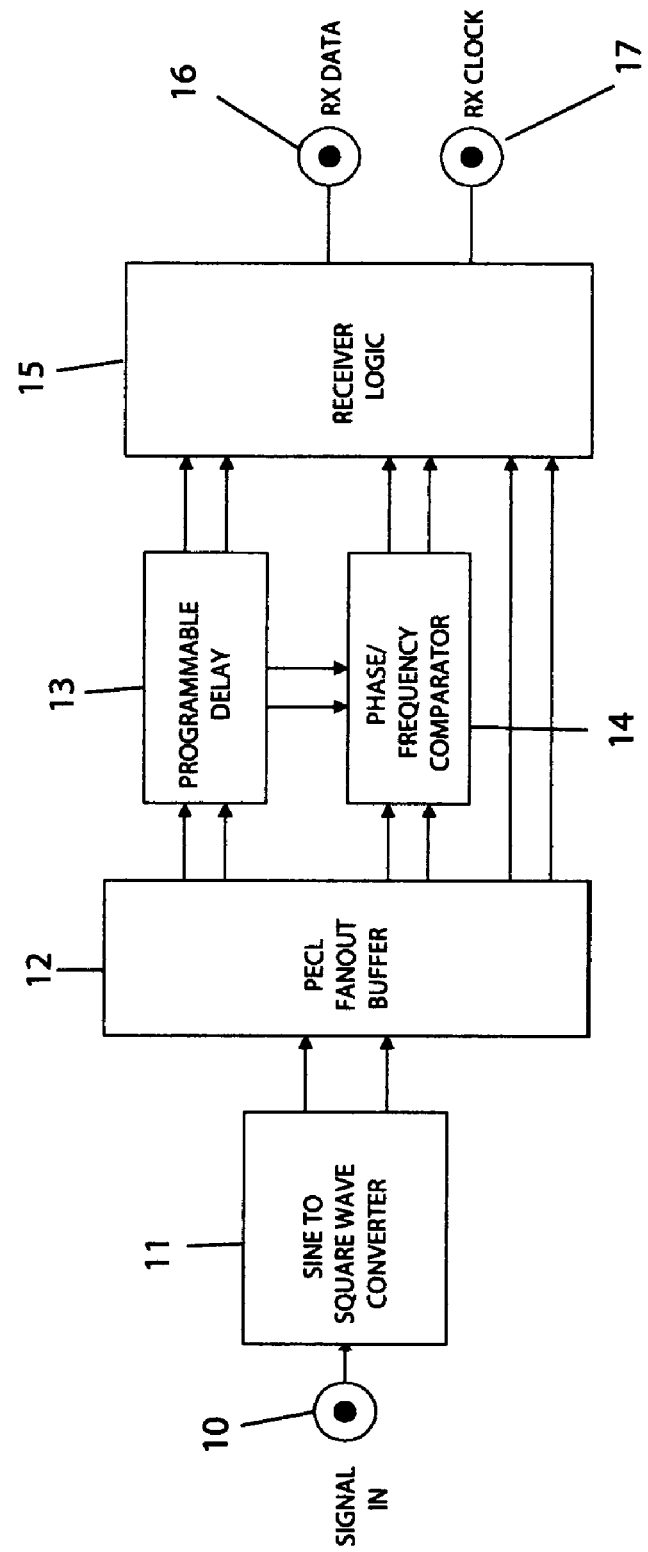
FIG. 3 is a block schematic diagram of a TICM receiver.

Referring now to FIG. 3 the reader can see how the de-modulation system is implemented in an embodiment of a receiver.

The Sine Wave To Square Wave Converter (11) block performs the following functions: It converts the incoming sinusoidal TICM signal (10) into PECL (positive ECL) square waves and performs Single-Ended-to-Differential Conversion. An Onsemi MC100EP16VA is used for this purpose in the preferred embodiment and the input coming to this converter can be as low as −25 dBm.

The PECL1 Fanout Buffer (12) block provides 1:2 or 1:3 fanouts for the signal coming into it. An Onsemi MC100EP11 is used for this purpose in the preferred embodiment. Since it's a 1:2 fanout buffer so there are two sets of identical differential outputs from this block (12). One set of input goes to the Programmable Delay(13) block and the other goes directly to the Phase/Frequency Comparator (14) block.

The Programmable Delay (13) block takes a set of differential input and delays it by exactly one clock cycle. Onsemi MC100EP196 is used for this purpose in the preferred embodiment. This delayed signal is applied to Phase/Frequency Comparator (14) block.

The Phase/Frequency Comparator (14) block receives two sets of differential input signals; one from the Programmable Delay (13) block (which is the delayed signal) and the second from PECL Fanout Buffer (12) block (which is a Non-Delayed Signal). This block (12) compares the two signals on a cycle-by-cycle basis and generates very sharp narrow pulses whenever the present non-delayed cycle is different in frequency from the delayed cycle. A High frequency XOR is used in the preferred embodiment as a Phase/Frequency Comparator (14). (Onsemi MC100EP08) Ideally, when the two signals are perfectly aligned, the output of the Phase/Frequency Comparator (14) is at logic zero i.e. the output of the Phase/Frequency Comparator (14) will not change state as long as the two signals are identical. As soon as a single cycle of different frequency comes in, output of Phase/Frequency Comparator (14) changes states. As stated earlier, the pulses coming out of this Phase/Frequency Comparator (14) are very narrow and sharp. They have a fixed amplitude and fixed width. The width and the amplitude of these pulses depend upon the difference between the two frequencies used in xG signal.

The Receiver Logic (15) block converts the narrow pulses from the Phase/Frequency Comparator (14) into NRZ data format (16) and the clock signal (17). This block aligns the delayed signal (also known as delayed clock) from Programmable Delay (13) block and non delayed signal (clock) such that both the clocks change states in the middle of the narrow pulses generated from Phase/Frequency Comparator (14). The idea is to differentiate between these pulses and pulses caused by noise. In the preferred embodiment flip-flops are used in this block and will only record data when there is a legitimate date pulse. Narrow pulses causes by noise are rejected by the Receiver Logic (15) because their amplitude and position doesn't align with both the clocks.

Thus, a system of radio modulation is disclosed that has the benefits of very minimal channel width requirements, no connection between information rate and the channel width and the ability to transport data at a rate commensurate with the radio frequency. The information rate will affect the power of the two (upper and lower) sidebands. The space between the sidebands is theoretically clear and available for re-use.

In this modulation signal and method the spectral width is fixed and the power of the singular upper and lower sidebands is affected by the data rate and the separation of the deviating frequencies. For example, if a wide deviation is chosen, the power of the sidebands will increase. If the data rate is increased, the same will happen but for a different reason. The wider deviation results in a higher index of modulation which increases the instantaneous amplitude of the sidebands for the duration of one RF cycle. Increasing the data rate increases the overall power located at the sideband frequencies because the pulse will repeat more often. A higher repetition rate results in more average power. The location of the sidebands remains constant The inventors recognize that, given the disclosure of this application, numerous variations and embodiments of the receiver and transmitter described above could be designed by those skilled in the art and those variations and embodiments are considered within the scope of this invention.

Because of the above-mentioned inherent advantages, TICM when used in conjunction with FDMA or TDMA also guarantees high-speed data transmission to multiple simultaneous users.

When used in FDMA mode, each user is assigned a particular carrier frequency to transmit/receive their information. Therefore, since the bandwidth requirement for a channel to transmit (or receive) high-speed data is low, hundreds or thousands of channels can be accommodated within a narrow spectral band. TICM in FDMA mode allows the user to use the channel 100% of the time.

When used in TDMA mode, multiple users share the common frequency band and they are required to transmit their information at different time slots within the carrier. Data is transmitted and received in bursts. These bursts are reassembled at the receiver (or base station) to provide continuous information.

Like CDMA, the TICM method has negligible interference from adjacent channels. But CDMA performance decreases as the system approaches its capacity (i.e., as the number of users increase, each user must transmit more power). This creates a coverage problem for CDMA. Thus, CDMA requires a tradeoff between maximum capacity and maximum coverage. The TICM system performance does not decrease with an increase in the number of users in a multiple access system. This is because when the TICM system is used in FDMA mode, each user will have its own carrier, and when the TICM system is used in TDMA mode, each user is allowed to transmit/receive in its particular time slot only. Thus capacity and coverage problems in TICM are negligible.

Since certain changes may be made in the above described RF signal and method without departing from the scope of the invention herein involved, it is intended that all matter contained in the description thereof or shown in the accompanying drawings shall be interpreted as illustrative and not in a limiting sense.

What is claimed is:

1. A modulated radio frequency carrier capable of transmitting a modulation event signifying binary information comprising:

(a) a carrier frequency waveform made up of a continuous sequence of wavelets;

(b) said wavelets being defined by a 360 degree cycle between crossover positions;

(c) said crossover positions representing a substantially zero energy level; and, (d) said wavelets having been modulated in accordance with said binary information by having altered the frequency of said wavelets corresponding to said binary information by increasing the frequency of said wavelets higher than said carrier frequency for one or a non-zero positive integer number of said wavelets then lowering the frequency of said wavelets lower than said carrier frequency for one or the same non-zero positive integer number of said wavelets then returning to said carrier frequency thereby creating a tri-state integer cycle modulated radio frequency carrier.

2. The modulated radio frequency carrier of claim 1 wherein:

the altering of the frequency of said wavelets is accomplished by lowering the frequency of said wavelets lower than said carrier frequency for one or a non-zero positive integer number of said wavelets then raising the frequency of said wavelets higher than said carrier frequency for one or the same non-zero positive integer number of said wavelets then returning to said carrier frequency thereby creating a tri-state integer cycle modulated radio frequency carrier.

3. A method for transmitting a modulation event signifying binary information over a radio frequency carrier comprising the steps of:

(a) generating a radio frequency carrier at a select carrier frequency such that said radio frequency carrier has a waveform with a continuous sequence of wavelets with similar amplitudes and frequencies;

(b) said wavelets being defined by a 360 degree cycle between crossover positions of said radio frequency carrier waveform;

(c) said crossover positions representing a substantially zero energy level;

(d) receiving said binary information;

(e) modulating said radio frequency carrier in accordance with said binary information by altering the frequency of said wavelets by increasing the frequency of said wavelets for one or a non-zero positive integer number of said wavelets then lowering the frequency of said wavelets for one or the same non-zero positive integer number of said wavelets then returning to said carrier frequency to derive a modulation event symbolizing said binary information thereby generating a tri-state integer cycle modulated carrier; and, (f) broadcasting said tri-state integer cycle modulated carrier such that a tri-state integer cycle modulated radio frequency signal is generated.

4. The method of claim 3 wherein:

the modulating of said radio frequency carrier is carried out by altering the frequency of said wavelets while minimizing sideband distortions of said radio frequency carrier.

5. The method of claim 3 wherein:

the generation of said radio frequency carrier is accomplished by a local oscillator having an oscillator output such that it generates a select carrier frequency.

6. The method of claim 3 wherein:

the altering of the frequency of said wavelets is accomplished by lowering the frequency of said wavelets for one or a non-zero positive integer number of said wavelets then raising the frequency of said wavelets for one or the same non-zero positive integer number of said wavelets then returning to said carrier frequency.

7. The method of claim 3 wherein:

broadcasting said tri-state integer cycle modulated carrier is accomplished using a Time Division Multiple Access system such that Time Division Multiple tri-state integer cycle modulated radio frequency signals are broadcasted.

8. The method of claim 3 wherein:

broadcasting said ti-state integer cycle modulated carrier is accomplished using a Frequency Division Multiple Access system such that Frequency Division Multiple tri-state integer cycle modulated radio frequency signals are broadcasted.

9. A method for receiving radio frequency transmitted binary information modulated onto a radio frequency carrier which has a waveform with a continuous sequence of wavelets with similar amplitudes and frequencies defined by a 360 degree cycle between crossover positions representing a substantially zero energy level in which the radio frequency carrier has been modulated by a modulation event symbolizing said binary information by altering the frequency of said wavelets by increasing the frequency of said wavelets for one or a non-zero positive integer number of said wavelets then lowering the frequency of said wavelets for one or the same non-zero positive integer number of said wavelets then returning to said carrier frequency thereby generating a tri-state integer cycle modulated carrier then broadcasting said tri-state integer cycle modulated carrier such that a tri-state integer cycle modulated radio frequency signal was generated and broadcasted comprising the steps of:

(a) receiving said tri-state integer cycle modulated radio frequency signal through an antenna responsive to said carrier radio frequency signal;

(b) extracting said tri-state integer cycle modulated carrier from said tri-state integer cycle modulated carrier radio frequency signal received by said antenna;

(c) demodulating said tri-state integer cycle modulated carrier by detecting the respective frequencies of said wavelets to identify said modulation event; and, (d) reconstructing said binary information from said modulation event.

10. The method of claim 9 wherein:

broadcasting and receiving said tri-state integer cycle modulated carrier is accomplished using a Time Division Multiple Access system such that Time Division Multiple tri-state integer cycle modulated radio frequency signals are broadcasted and received.

11. The method of claim 9 wherein:

broadcasting and receiving said tri-state integer cycle modulated carrier is accomplished using a Frequency Division Multiple Access system such that Frequency Division Multiple tri-state integer cycle modulated radio frequency signals are broadcasted and received.

12. The method of claim 9 wherein:

the altering of the frequency of said wavelets is accomplished by lowering the frequency of said wavelets for one or a non-zero positive integer number of said wavelets then raising the frequency of said wavelets for one or the same non-zero positive integer number of said wavelets then returning to said carrier frequency.

13. A method for transmitting binary information signified by a modulation event over a radio frequency carrier, receiving the modulated radio frequency carrier, and converting the modulation event back into binary information comprising the steps of:

(a) generating a radio frequency carrier at a select carrier frequency such that said radio frequency carrier has a waveform with a continuous sequence of wavelets with similar amplitudes and frequencies;

(b) said wavelets being defined by a 360 degree cycle between crossover positions of said radio frequency carrier waveform;

(c) said crossover positions representing a substantially zero energy level;

(d) receiving said binary information;

(e) modulating said radio frequency carrier in accordance with said binary information by altering the frequency of said wavelets corresponding to said binary information by increasing the frequency of said carrier for one or a non-zero positive integer number of said wavelets then lowering the frequency of said carrier for one or the same non-zero positive integer number of said wavelets then returning to said carrier frequency to derive said modulation event thereby generating a tri-state integer cycle modulated carrier;

(e) broadcasting said tri-state integer cycle modulated carrier such that a tri-state integer cycle modulated radio frequency signal is generated;

(f) receiving said tri-state integer cycle modulated radio frequency signal through an antenna responsive to said carrier radio frequency signal;

(g) extracting said tri-state integer cycle modulated carrier from said tri-state integer cycle modulated carrier radio frequency signal received by said antenna;

(h) demodulating said tri-state integer cycle modulated carrier by detecting the respective frequencies of said wavelets to identify said modulation event; and, (i) reconstructing said binary information from said modulation event resulting in regeneration of said binary information.

14. The method of claim 13 wherein:

the generation of said radio frequency carrier is accomplished by a local oscillator having an oscillator output such that it generates a select carrier frequency.

15. The method of claim 13 wherein:

the altering of the frequency of said wavelets is accomplished by lowering the frequency of said wavelets for one or a non-zero positive integer number of said wavelets then raising the frequency of said wavelets for one or the same non-zero positive integer number of said wavelets then returning to said carrier frequency.

16. The method of claim 13 wherein:

broadcasting and receiving said tri-state integer cycle modulated carrier is accomplished using a Time Division Multiple Access system such that Time Division Multiple tri-state integer cycle modulated radio frequency signals are broadcasted and received.

17. The method of claim 13 wherein:

broadcasting and receiving said tri-state integer cycle modulated carrier is accomplished using a Frequency Division Multiple Access system such that Frequency Division Multiple tri-state integer cycle modulated radio frequency signals are broadcasted and received.

* * * * *